(12) United States Patent
Nelson

(10) Patent No.: US 9,976,390 B2
(45) Date of Patent: May 22, 2018

(54) DRILLING FLUIDS WITH LEAKOFF CONTROL AND DRILL CUTTINGS REMOVAL SWEEPS

(71) Applicant: Scott Gregory Nelson, Cypress, TX (US)

(72) Inventor: Scott Gregory Nelson, Cypress, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 0 days. days.

(21) Appl. No.: 15/083,334

(22) Filed: Mar. 29, 2016

(65) Prior Publication Data

US 2016/0289530 A1    Oct. 6, 2016

Related U.S. Application Data

(60) Provisional application No. 62/140,105, filed on Mar. 30, 2015.

(51) Int. Cl.

| | |
|---|---|
| *E21B 37/06* | (2006.01) |
| *C09K 8/52* | (2006.01) |
| *E21B 33/134* | (2006.01) |
| *C09K 8/62* | (2006.01) |
| *C09K 8/70* | (2006.01) |
| *C09K 8/80* | (2006.01) |
| *E21B 43/26* | (2006.01) |
| *E21B 43/267* | (2006.01) |
| *C09K 8/76* | (2006.01) |
| *E21B 33/138* | (2006.01) |
| *C09K 8/575* | (2006.01) |
| *C09K 8/68* | (2006.01) |
| *E21B 43/04* | (2006.01) |
| *C09K 8/035* | (2006.01) |
| *C09K 8/12* | (2006.01) |
| *C09K 8/34* | (2006.01) |
| *E21B 21/00* | (2006.01) |

(52) U.S. Cl.
CPC ............ *E21B 37/06* (2013.01); *C09K 8/035* (2013.01); *C09K 8/12* (2013.01); *C09K 8/34* (2013.01); *C09K 8/52* (2013.01); *C09K 8/5756* (2013.01); *C09K 8/62* (2013.01); *C09K 8/68* (2013.01); *C09K 8/685* (2013.01); *C09K 8/70* (2013.01); *C09K 8/703* (2013.01); *C09K 8/706* (2013.01); *C09K 8/76* (2013.01); *C09K 8/80* (2013.01); *E21B 21/00* (2013.01); *E21B 21/003* (2013.01); *E21B 33/134* (2013.01); *E21B 33/138* (2013.01); *E21B 43/04* (2013.01); *E21B 43/26* (2013.01); *E21B 43/267* (2013.01); *C09K 2208/26* (2013.01)

(58) Field of Classification Search
None
See application file for complete search history.

(56) References Cited

U.S. PATENT DOCUMENTS

| | | | |
|---|---|---|---|
| 3,425,971 A | 2/1969 | Gugliemelli et al. | |
| 4,286,082 A * | 8/1981 | Tsubakimoto | ......... A61L 15/18 |
| | | | 428/402 |
| 5,086,841 A * | 2/1992 | Reid | ....... C09K 8/32 |
| | | | 166/294 |
| 5,143,157 A | 9/1992 | Harms | |
| 5,441,109 A | 8/1995 | Gupta et al. | |
| 5,806,597 A | 9/1998 | Tjon-Joe-Pin et al. | |
| 5,981,447 A | 11/1999 | Chang et al. | |
| 6,164,380 A | 12/2000 | Davis | |
| 6,169,058 B1 | 1/2001 | Le et al. | |
| 6,410,489 B1 | 6/2002 | Zhang et al. | |
| 6,419,019 B1 | 7/2002 | Palmer et al. | |
| 7,971,643 B2 | 7/2011 | Brannon et al. | |
| 8,109,336 B2 | 2/2012 | Wheeler et al. | |
| 8,839,859 B2 | 9/2014 | Ivan et al. | |
| 2002/0007949 A1 | 1/2002 | Tolman et al. | |
| 2002/0040812 A1 * | 4/2002 | Heying | .................. C09K 8/035 |
| | | | 175/72 |
| 2003/0236171 A1 | 12/2003 | Nguyen et al. | |
| 2005/0080182 A1 * | 4/2005 | Ahmed | ...................... C08J 3/03 |
| | | | 524/458 |
| 2006/0086501 A1 * | 4/2006 | Creel | ...................... C04B 28/26 |
| | | | 166/281 |
| 2008/0085843 A1 | 4/2008 | Wang et al. | |
| 2009/0082228 A1 | 3/2009 | Parris et al. | |
| 2009/0095324 A1 | 4/2009 | Crowther et al. | |
| 2009/0221453 A1 | 9/2009 | Mukhopadhyay et al. | |
| 2010/0099781 A1 | 4/2010 | Tian et al. | |
| 2010/0126735 A1 | 5/2010 | Allison et al. | |
| 2011/0253454 A1 | 10/2011 | Freeman | |

(Continued)

OTHER PUBLICATIONS

"VaporFrac Fracturing Fluid", Retrieved from the Internet [https://www.bakerhughes.com/products-and-services/pressure-pumping/hydraulic-fracturing/fracturing-fluid-systems-proppant-technology/proppant-technology-vaporfrac], Baker Hughes; 10 pages.

Dragan, "Design and applications of interpenetrating polymer network hydrogels, A review", Chemical Engineering Journal 243 (2014), pp. 572-590.

International Search Report, International Application No. PCT/US2016/024859, dated Jul. 12, 2016, Korean Intellectual Property Office; International Search Report 3 pages.

Written Opinion of the International Searching Authority, International Application No. PCT/US2016/024859, dated Jul. 12, 2016, Korean Intellectual Property Office; Written Opinion 7 pages.

*Primary Examiner* — Angela M DiTrani
(74) *Attorney, Agent, or Firm* — Cantor Colburn LLP

(57) ABSTRACT

A method of drilling a wellbore in a subterranean formation comprises circulating a water-based or oil-based drilling fluid in the subterranean formation; the water-based or oil-based drilling fluid comprising a carrier, and a superabsorbent polymer present in an amount effective to reduce fluid leakoff during the drilling operation, the superabsorbent polymer comprising crosslinks formed before the superabsorbent polymer is combined with the carrier.

22 Claims, No Drawings

(56) References Cited

U.S. PATENT DOCUMENTS

| | | |
|---|---|---|
| 2012/0252264 A1 | 10/2012 | Zraik |
| 2013/0056213 A1 | 3/2013 | Medvedev et al. |
| 2013/0233545 A1 | 9/2013 | Mahoney et al. |
| 2013/0248191 A1 | 9/2013 | Nguyen |
| 2014/0000896 A1 | 1/2014 | Wang et al. |
| 2014/0000897 A1 | 1/2014 | Wang et al. |
| 2014/0024561 A1* | 1/2014 | Reddy .................. C08J 3/245 507/117 |
| 2014/0158355 A1 | 6/2014 | Wuthrich et al. |
| 2014/0332213 A1 | 11/2014 | Zhou |
| 2014/0332214 A1 | 11/2014 | Zhou et al. |
| 2015/0210912 A1* | 7/2015 | Amanullah .............. C09K 8/20 175/65 |
| 2016/0289530 A1 | 10/2016 | Nelson |
| 2016/0289541 A1 | 10/2016 | Zhou et al. |
| 2016/0289547 A1 | 10/2016 | Gupta et al. |
| 2016/0289549 A1 | 10/2016 | Nelson et al. |
| 2016/0290104 A1 | 10/2016 | Nelson et al. |

* cited by examiner

DRILLING FLUIDS WITH LEAKOFF CONTROL AND DRILL CUTTINGS REMOVAL SWEEPS

CROSS REFERENCE TO RELATED APPLICATION

This application claims the benefit of U.S. Patent Application No. 62/140,105, filed Mar. 30, 2015, which is incorporated by reference in its entirety herein.

BACKGROUND

This disclosure relates to drilling fluids with leakoff control, and methods of drilling a wellbore with the drilling fluids.

A drilling fluid, also called drilling mud, is a complex heterogeneous fluid. It can facilitate drilling operations by lubricating and cooling the bit, carrying drill cuttings to the surface, and providing buoyancy to support drill pipe and casing. The drilling fluid also provides hydrostatic pressure to prevent collapse of unstable strata and intrusion of undesirable fluid flow from the formation.

Drilling fluids are typically classified according to their base fluid. In water-based muds, solid particles are suspended in fresh water or brine. If present, oil can be emulsified in the water. Nonetheless, the water is the continuous phase. Oil-based muds (OBM) are the opposite or inverse. Solid particles are suspended in oil, and water or brine is emulsified in the oil and therefore the oil is the continuous phase.

Since oil is much more expensive than water, water-based drilling fluids are more economical than oil-based drilling fluids. However, water-based drilling fluids are the least efficient means of transporting the drill cuttings to the surface. During the drilling of the well, and especially in the drilling of horizontal laterals, the need to efficiently remove the drill cuttings is important to the well. Gravity effects during the drilling of high angle and horizontal wells cause cuttings to fall to the bottom of the drilled hole along what is termed the cuttings bed. The cleanup and removal of the formation cuttings are always of concern during the drilling process since drilling fluids are often less than perfect particle transport mediums. The inability of cuttings removal can have detrimental effects on the drilling processes, and can even stick the drill pipe if the cuttings bed buildup becomes too severe.

Despite all the advances, the art would be receptive to alternative methods that are effective to improve cuttings removal efficiencies for drilling fluids, particularly water-based drilling fluids. It would be a further advantage if such methods are effective to eliminate or reduce fluid leakoff.

BRIEF DESCRIPTION

A method of drilling a wellbore in a subterranean formation comprises circulating a water-based or oil-based drilling fluid in the subterranean formation; the water-based or oil-based drilling fluid comprising a carrier, and a superabsorbent polymer present in an amount effective to reduce fluid leakoff during the drilling operation, the superabsorbent polymer comprising crosslinks formed before the superabsorbent polymer is combined with the carrier.

A method of removing cuttings from a wellbore comprises circulating a pill or a sweep during a drilling operation into a wellbore, the pill or sweep comprising a superabsorbent polymer, the superabsorbent polymer comprising crosslinks formed before circulating the pill or sweep; and sweeping drill cuttings to the surface of the wellbore.

DETAILED DESCRIPTION

It has been found that superabsorbent polymers described herein impart desirable properties to water-based and oil-based drilling fluids. In particular, superabsorbent polymers used in a water-based or oil-based drilling fluid are effective to prevent or reduce fluid loss and to improve drill cuttings removal efficiencies. In an embodiment, the drilling fluid containing the superabsorbent polymer is operable to achieve an API (American Petroleum Institute) fluid loss of less than 15 cc. Without wishing to be bound by theory, it is believed that superabsorbent polymers in a hydrated form have wall building characteristics and can form a mudcake, also referred to as filter cake, having a low permeability on a borehole wall thus reducing or eliminating the fluid leakoff out of the wellbore. Moreover, superabsorbent polymers can swell significantly in the presence of water forming a pack thus improving drill cuttings suspension and removal efficiencies.

Alternatively or in addition, well treatment pills or sweeps are used during the drilling process to remove the accumulation of cuttings. It has been found that a superabsorbent-containing fluid, which is a high efficiency particle transport fluid, provides a novel approach to cuttings bed removal. In addition, superabsorbent polymers can also be used to create pills in the form of high viscosity sweeps to remove large amounts of drilled solids when penetration rates increase as softer formations are drilled.

As used herein, water-based drilling fluids are either all-water based or oil-in-water emulsions. In an oil-in-water emulsion, an oil is emulsified in water, but water is the continuous phase. Water-based drilling fluids contain an aqueous-based carrier and a superabsorbent polymer present in an amount effective to reduce fluid leakoff during the drilling operations and to improve cutting removal efficiencies as compared to a drilling fluid without the superabsorbent polymer.

The aqueous-based carrier can be fresh water or brine. The brine can be, for example, seawater, produced water, completion brine, or a combination comprising at least one of the foregoing. The properties of the brine can depend on the identity and components of the brine. Seawater, for example, can contain numerous constituents including sulfate, bromine, and trace metals, beyond typical halide-containing salts. Produced water can be water extracted from a production reservoir (e.g., hydrocarbon reservoir) or produced from the ground. Produced water can also be referred to as reservoir brine and contain components including barium, strontium, and heavy metals. In addition to naturally occurring brines (e.g., seawater and produced water), completion brine can be synthesized from fresh water by addition of various salts for example, KCl, NaCl, $ZnCl_2$, $MgCl_2$, or $CaCl_2$ to increase the density of the brine, such as about 1 to about 0.6 pounds per gallon of $CaCl_2$ brine. Completion brines typically provide a hydrostatic pressure optimized to counter the reservoir pressures downhole. The above brines can be modified to include one or more additional salts. The additional salts included in the brine can be NaCl, KCl, NaBr, $MgCl_2$, $CaCl_2$, $CaBr_2$, $ZnBr_2$, $NH_4Cl$, sodium formate, cesium formate, and combinations comprising at least one of the foregoing. The salt can be present in the brine in an amount of about 0.001 to about 50 weight percent (wt. %), specifically about 0.001 to about 40 wt. %, and more specifically about 0.001 to about 25 wt. %, based on the weight of the fluid.

The drilling fluids can also be an oil-based fluid such as an oil-based mud (OBM). The oil-based mud is either all-oil based or a water-in-oil emulsion, which is also called invert emulsion. In an invert emulsion, solid particles are suspended in oil, and water or brine is emulsified in the oil and therefore the oil is the continuous phase.

The oil in the oil-in-water emulsions or oil-based muds may comprise any oil including, but not limited to, a diesel oil; a paraffin oil; a vegetable oil; a soybean oil; a mineral oil; an aliphatic solvent, an aromatic solvent; or a synthetic oil; or a combination comprising at least one of the foregoing.

In an embodiment, the superabsorbent polymer is present in the water-based or the oil-based drilling fluids in an amount of about 1 to about 100 pounds of the superabsorbent polymer per thousand gallons of the drilling fluids, specifically, about 10 to about 80 pounds, about 30 to about 60 pounds, about 1 to about 40 pounds, about 1 to about 30 pounds, or about 10 to about 20 pounds of the superabsorbent polymer per thousand gallons of the drilling fluids. The superabsorbent polymer can be in an unhydrated form, or at least partially hydrated before it is combined with the aqueous-based carrier. When the superabsorbent polymer is used in an oil-based drilling fluid, the superabsorbent polymer is at least partially hydrated before it is combined with an oil-based carrier, which can include an oil or water-in-oil emulsion.

As used herein, a superabsorbent polymer (SAP) is a crosslinked polymer that is capable of absorbing large amounts of aqueous liquids, such as water and brine, with swelling and the formation of a gel or viscous material, and that retains the absorbed fluid under a certain pressure or temperature. The superabsorbent polymer can have internal crosslinks, surface crosslinks, or a combination comprising at least one of the foregoing.

The superabsorbent polymers can be a variety of synthetic organic polymers that react with or absorb water and swell when contacted with an aqueous fluid. Non-limiting examples of such superabsorbent polymers are poly(hydroxy $C_{1-8}$ alkyl (meth)acrylate)s such as (2-hydroxyethyl acrylate), poly(meth)acrylamide, poly(vinyl pyrrolidine), poly(vinyl acetate), starch-acrylonitrile grafted copolymer of polyacrylonitrile, carboxymethyl cellulose, crosslinked polyacrylates, sulfonated polystyrene, hydrolyzed polyacrylamide, polyvinyl alcohol, polyethylene oxide, polyvinyl pyrrolidone, polyacrylonitrile, and the like. The foregoing are inclusive of copolymers, for example copolymers of (meth)acrylamide with maleic anhydride, vinyl acetate, ethylene oxide, ethylene glycol, or acrylonitrile, or a combination comprising at least one of the foregoing. A combination of different polymers can be used.

The superabsorbent polymers are polymerized from non-ionic, anionic, cationic monomers, or a combination comprising at least one of the foregoing. Polymerization can be via free-radical polymerization, solution polymerization, gel polymerization, emulsion polymerization, dispersion polymerization, or suspension polymerization. Moreover, polymerization can be performed in an aqueous phase, in inverse emulsion, or in inverse suspension.

Examples of nonionic monomers for preparing the preformed synthetic polymers include (meth)acrylamide, alkyl-substituted (meth)acrylamides, aminoalkyl-substituted (meth)acrylamides, alkyliminoalkyl-substituted (meth)acrylamides, vinyl alcohol, vinyl acetate, allyl alcohol, $C_{1-8}$ alkyl (meth)acrylates, hydroxy$C_{1-8}$ alkyl (meth)acrylates such as hydroxyethyl (meth)acrylate, N-vinylformamide, N-vinylacetamide, and (meth)acrylonitrile. As used herein, "poly ((meth)acrylamide)s" includes polymer comprising units derived from (meth)acrylamide, alkyl-substituted (meth) acrylamides such as N-$C_{1-8}$ alkyl (meth)acrylamides and N,N-di($C_{1-8}$ alkyl) (meth)acrylamides, aminoalkyl-substituted (meth)acrylamides such as N,N-di(amino($C_{1-8}$ alkyl))-substituted (meth)acrylamides, and (N,N-dialkylamino) alkyl-substituted (meth)acrylamides such as (N,N-di($C_{1-8}$ alkyl)amino)($C_{1-8}$ alkyl) (meth)acrylamides. Specific examples of the foregoing monomers include methacrylamide, N-methyl acrylamide, N-methyl methacrylamide, N,N-dimethyl acrylamide, N-ethyl acrylamide, N,N-diethyl acrylamide, N-cyclohexyl acrylamide, N-benzyl acrylamide, N,N-dimethylaminopropyl acrylamide, N,N-dimethylaminoethyl acrylamide, N-tert-butyl acrylamide, or a combination comprising at least one of the foregoing. In an embodiment, the poly((meth)acrylamide) is a copolymer of methacrylamide with maleic anhydride, vinyl acetate, ethylene oxide, ethylene glycol, or acrylonitrile, or a combination comprising at least one of the foregoing.

Examples of anionic monomers include ethylenically unsaturated anionic monomers having acidic groups, for example, a carboxylic group, a sulfonic group, a phosphonic group, a salt thereof, the corresponding anhydride or acyl halide, or a combination comprising at least one of the foregoing acidic groups. For example, the anionic monomer can be (meth)acrylic acid, ethacrylic acid, maleic acid, maleic anhydride, fumaric acid, itaconic acid, α-chloroacrylic acid, β-cyanoacrylic acid, β-methylacrylic acid, α-phenylacrylic acid, α-acryloyloxypropionic acid, sorbic acid, α-chlorosorbic acid, 2'-methylisocrotonic acid, cinnamic acid, p-chlorocinnamic acid, β-stearyl acid, citraconic acid, mesaconic acid, glutaconic acid, aconitic acid, 2-acrylamido-2-methylpropanesulfonic acid, allyl sulfonic acid, vinyl sulfonic acid, allyl phosphonic acid, vinyl phosphonic acid, a salt thereof, or a combination comprising at least one of the foregoing.

Examples of cationic monomers include (N,N-di($C_{1-8}$ alkylamino)($C_{1-8}$alkyl) (meth)acrylates (e.g., N,N-dimethylaminoethyl acrylate and N,N-dimethylaminoethyl methacrylate), (wherein the amino group is quaternized to, e.g., a methyl chloride quaternary form), diallyldimethyl ammonium chloride, or any of the foregoing alkyl-substituted (meth)acrylamides and dialkylaminoalkyl-substituted (meth)acrylamides, such as (N,N-di($C_{1-8}$alkyl)amino)$C_{1-8}$ alkyl acrylamide, and the quaternary forms thereof such as acrylamidopropyl trimethyl ammonium chloride.

The superabsorbent polymer can contain both cationic substituents and anionic substituents. The cationic substituents and anionic substituents occur in various stoichiometric proportions, for example, a ratio of about 1:1, or one monomer can be present in a greater stoichiometric amount than the other monomer. Representative amphoteric polymers include terpolymers of nonionic monomers, anionic monomers and cationic monomers.

In an embodiment, the SAP includes a repeating unit derived from an acrylate, an acrylic acid or a salt thereof, an acrylamide, a vinylpyrrolidone, a vinyl ester (e.g., a vinyl acetate), a vinyl alcohol, a 2-acrylamide-2-methylpropanesulfonic acid, a derivative thereof, or a combination thereof.

The superabsorbent polymer can include a plurality of crosslinks among the polymer chains of the superabsorbent polymer. The crosslinks can be covalent and result from crosslinking the polymer chains using a crosslinker. The crosslinks are formed before the SAP is combined with the aqueous carrier. The crosslinker can be an ethylenically-unsaturated monomer that contains, for example, two sites of ethylenic unsaturation (i.e., two ethylenically unsaturated double bonds), an ethylenically unsaturated double bond and a functional group that is reactive toward a functional group (e.g., an amide group) of the polymer chains of the superabsorbent polymer, or several functional groups that are reactive toward functional groups of the polymer chains of the superabsorbent polymer. The degree of crosslinking can be selected so as to control the amount of swelling of the superabsorbent polymer. For example, the degree of crosslinking can be used to control the amount of fluid absorption or the volume expansion of the superabsorbent polymer. Accordingly, when the polymer particles comprise a superabsorbent polymer, the degree of crosslinking can be used to control the amount of fluid absorption or the volume expansion of the polymer particles.

Exemplary crosslinkers include a di(meth)acrylamide of a diamine such as a diacrylamide of piperazine, a $C_{1-8}$ alkylene bisacrylamide such as methylene bisacrylamide and ethylene bisacrylamide, an N-methylol compounds of an unsaturated amide such as N-methylol methacrylamide or N-methylol acrylamide, a (meth)acrylate esters of a di-, tri-, or tetrahydroxy compound such as ethylene glycol diacrylate, poly(ethyleneglycol) di(meth)acrylate, trimethylolpropane tri(meth)acrylate, ethoxylated trimethylol tri(meth) acrylate, glycerol tri(meth)acrylate), ethoxylated glycerol tri(meth)acrylate, pentaerythritol tetra(meth)acrylate, ethoxylated pentaerythritol tetra(meth)acrylate, butanediol di(meth)acrylate), a divinyl or diallyl compound such as allyl (meth)acrylate, alkoxylated allyl(meth)acrylate, diallylamide of 2,2'-azobis(isobutyric acid), triallyl cyanurate, triallyl isocyanurate, maleic acid diallyl ester, polyallyl esters, tetraallyloxyethane, triallylamine, and tetraallylethylene diamine, a diols polyol, hydroxyallyl or acrylate compounds, and allyl esters of phosphoric acid or phosphorous acid. Specifically mentioned are water soluble diacrylates such as poly(ethylene glycol) diacrylate (e.g., PEG 200 diacrylate or PEG 400 diacrylate). A combination comprising any of the above-described crosslinkers can also be used. Additional crosslinks are described in US 2014/0332213, US 2014/0332214, and US 2015/0096751.

When the superabsorbent polymer is in the form of a particle, the particle can includes surface crosslink external to the interior of the particle. The surface crosslinks can result from addition of a surface crosslinker to the superabsorbent polymer particle and subsequent heat treatment. The surface crosslinks can increase the crosslink density of the particle near its surface with respect to the crosslink density of the interior of the particle. Surface crosslinkers can also provide the particle with a chemical property that the superabsorbent polymer did not have before surface crosslinking, and can control the chemical properties of the particle, for example, hydrophobicity, hydrophilicity, and adhesiveness of the sup erabsorbent polymer to other materials, for example, minerals (e.g., silicates) or other chemicals, for example, petroleum compounds (e.g., hydrocarbons, asphaltene, and the like).

Surface crosslinkers have at least two functional groups that are reactive with a group of the polymer chains, for example, any of the above crosslinkers, or crosslinkers having reactive functional groups such as an acid (including carboxylic, sulfonic, and phosphoric acids and the corresponding anions), an amide, an alcohol, an amine, or an aldehyde. Exemplary surface crosslinkers include polyols, polyamines, polyaminoalcohols, and alkylene carbonates, such as ethylene glycol, diethylene glycol, triethylene glycol, polyethylene glycol, glycerol, polyglycerol, propylene glycol, diethanolamine, triethanolamine, polypropylene glycol, block copolymers of ethylene oxide and propylene oxide, sorbitan fatty acid esters, ethoxylated sorbitan fatty acid esters, trimethylolpropane, ethoxylated trimethylolpropane, pentaerythritol, ethoxylated pentaerythritol, polyvinyl alcohol, sorbitol, ethylene carbonate, propylene carbonate, and combinations comprising at least one of the foregoing.

Additional surface crosslinkers include borate, titanate, zirconate, aluminate, chromate, or a combination comprising at least one of the foregoing. Boron crosslinkers include boric acid, sodium tetraborate, encapsulated borates, and the like. Borate crosslinkers can be used with buffers and pH control agents including sodium hydroxide, magnesium oxide, sodium sesquicarbonate, and sodium carbonate, amines (such as hydroxyalkyl amines, anilines, pyridines, pyrimidines, quinolines, pyrrolidines, and carboxylates such as acetates and oxalates), delay agents including sorbitol, aldehydes, sodium gluconate, and the like. Zirconium crosslinkers, e.g., zirconium lactates (e.g., sodium zirconium lactate), triethanolamines, 2,2'-iminodiethanol, or a combination comprising at least one of the foregoing can be used. Titanates crosslinkers can include, for example, lactates, triethanolamines, and the like.

Preferably the SAPs do not contain any surface crosslinks and all the internal crosslinks are formed before the SAPs are combined with the carrier for the drilling fluid. Accordingly the drilling fluid can be free of crosslinking agents.

Non-limiting examples of SAPs include poly 2-hydroxyethyl acrylate, polyalkyl acrylate, polyacrylamide, poly methacrylamide, poly vinylpyrrolidone, poly vinyl acetate, polyacrylic acid, polyacrylic acid salt, or copolymers thereof. As a specific example, the SAP is polyacrylamide having crosslinks that are polyethylene glycol diacrylate. As another specific example, the SAP is a copolymer of acrylamide with, for example, maleic anhydride, vinyl acetate, ethylene oxide, ethylene glycol, acrylonitrile, or a combination thereof Another specific example of SAP is polyacrylamide having crosslinks that are polyethylene glycol diacrylate. In some embodiments, the SAP is polyacrylic acid homopolymer or copolymer, wherein the crosslinks are vinyl ester oligomer. In an embodiment, the superabsorbent polymer is a copolymer of acrylic acid and acrylate such as sodium acrylate having crosslinks, for example crosslinks derived from polyethylene glycol diacrylate.

The SAP can be in a number of formats, including a particle (e.g., a powder), fiber, strand, braid, and the like, or a combination thereof. The size of the SAP is from 10 µm to 100,000 µm, specifically 50 µm to 10,000 µm, and more specifically 50 µm to 2000 µm. As used herein, "size" refers to the largest linear dimension, e.g., a diameter in a spherical particle. Particles of the SAP are any shape including spherical, angular, and polyhedral. As used herein, "size" refers to the largest linear dimension, e.g., a diameter in a spherical particle. Particles of the SAP are any shape including spherical, angular, and polyhedral.

In some embodiments, the drilling fluid can further comprise a polysaccharide. Exemplary polysaccharides include starch, cellulose, xanthan gum, agar, pectin, alginic acid, tragacanth gum, pluran, gellan gum, tamarind seed gum, cardlan gum, guar gum, arabic, glucomannan, chitin, chitosan, hyaluronic acid, and combinations comprising at least one of the foregoing. The amount of the polysaccharide in the fracturing fluid is between from about 1 pound of the polysaccharide per thousand gallons of the drilling fluid (ppt) to about 30 ppt, specifically from about 3 ppt to about 25 ppt or from about 5 ppt to about 20 ppt. In other embodiments, the drilling fluid is free of polysaccharides.

Without wishing to be bound by theory, it is believed that the addition of a small amount of polysaccharide can further improve the cuttings removal efficiencies. However, it is appreciated that a polysaccharide is an optional component. In some embodiments, the drilling fluid is free of polysaccharides.

Known additives typically used in the drilling fluids include but are not limited to emulsifiers, weighting materials, rheology modifier, clay, viscosifiers, defoamers, fluid loss agents, bentonite, and monovalent and divalent ions used for brine such as potassium chloride, calcium chloride, calcium bromide, sodium formate, potassium formate and combinations thereof. It is appreciated that the drilling fluids can be free of proppant used in fracturing applications.

The downhole compositions can be used in various applications. A method of drilling a wellbore in a subterranean formation comprises circulating a drilling fluid as disclosed herein in the subterranean formation. The circulation path of the drilling fluid typically extends from the drilling rig down through the drill pipe string to the bit face and back up through the annular space between the drill pipe string and wellbore face to the wellhead and/or riser, returning to the rig.

The drilling fluid performs a number of functions as it circulates through the wellbore including cooling and lubricating the drill bit, removing drill cuttings from the wellbore, aiding in support of the drill pipe and drill bit, and providing a hydrostatic head to maintain the integrity of the wellbore walls and prevent well blowouts. The drilling fluid also desirably prevents sloughing and wellbore cave-ins when drilling through water sensitive formations.

In some embodiments, well treatments or circulation of fluids, called sweeps or sometimes pills, formulated to remove cuttings beds and other cuttings that would normally not be brought out of the wellbore by a base drilling fluid system, can be periodically used to prevent buildup to the degree that the cuttings or fines interfere with the drilling apparatus or otherwise with the drilling operation. As used herein, a base drilling fluid system is not particularly limited and includes any drilling systems such as water-based or oil-based drilling systems known to a person skilled in the art.

These sweeps or pills can have theoretical or density properties significantly different from those of the base drilling fluid system being used, and typically are formulated in small volumes (e.g., less than 150 bbl). In an embodiment, the sweeps or pills comprise water or brine and a superabsorbent polymer as disclosed herein in an amount effective to remove drill cuttings such as large amounts of drilled solids or cuttings beds that regular drilling fluids are typically not effective to remove. In another embodiment, the sweeps or pills comprise oil or a water-in-oil emulsion and a superabsorbent polymer as disclosed herein. For example, the superabsorbent polymer can be used in an amount of about 5 ppt to about 100 ppt, about 10 ppt to about 80 ppt, about 30 ppt to about 60 ppt. Other additives such weighting materials, friction reducers, surfactants, nonemulsifiers, gel stabilizers, or other polymers that can aid hydration and effectiveness such as a polysaccharide can also be included in the sweeps or pills. The sweeps or pills have a viscosity of 100 cP to 2,000 cP at 23° C.

A method of removing drill cuttings comprises circulating a pill or a high viscosity sweep comprising a superabsorbent polymer as disclosed herein into a wellbore, and sweeping drill cuttings to the surface of the wellbore. In some embodiments, the drilling operation is stopped while treatment fluids are swept through the wellbore to remove the cuttings.

The method can include introducing a pill or sweep through a conduit such as the drill string, or through a casing string, tubing string, or coiled tubing string inserted into the wellbore and receiving a returning fluid comprising drill cuttings at the surface from an annular space between the conduit and a wall of the wellbore. Coiled tubing is specifically mentioned. In other embodiments, the sweeps or pills can be periodically injected into the wellbore by adding it to the drilling fluid circulating through the wellbore without stopping the drilling operation.

Further included in this disclosure are the following specific embodiments, which do not necessarily limit the claims.

Embodiment 1. A method of drilling a wellbore in a subterranean formation, the method comprising:
circulating a water-based or oil-based drilling fluid in the subterranean formation; the water-based or oil-based drilling fluid comprising
a carrier, and a superabsorbent polymer present in an amount effective to reduce fluid leakoff during the drilling operation, the superabsorbent polymer comprising crosslinks formed before the superabsorbent polymer is combined with the carrier.

Embodiment 2. The method of Embodiment 1, wherein the drilling fluid comprises greater than about 1 to less than about 40 pounds of the superabsorbent polymer per one thousand gallons of the drilling fluid.

Embodiment 3. The method of Embodiment 1 or Embodiment 2, wherein the superabsorbent polymer is in an unhydrated form before the superabsorbent polymer is combined with the carrier.

Embodiment 4. The method of any one of Embodiments 1 to 3, wherein the superabsorbent polymer is at least partially hydrated before the superabsorbent polymer is combined with the carrier .

Embodiment 5. The method of any one of Embodiments 1 to 4, wherein the superabsorbent polymer comprises a repeating unit derived from an acrylic acid or a salt thereof, an acrylate, an acrylamide, a vinylpyrrolidone, a vinyl acetate, a vinyl alcohol, a 2-acrylamide-2-methylpropanesulfonic acid, a derivative thereof, or a combination thereof Embodiment 6. The method of any one of Embodiments 1 to 5, wherein the superabsorbent polymer is a copolymer of acrylic acid and sodium acrylate.

Embodiment 7. The method of any one of Embodiments 1 to 6, wherein the superabsorbent polymer comprises crosslinks derived from polyethylene glycol diacrylate.

Embodiment 8. The method of any one of Embodiments 1 to 7, wherein the drilling fluid is free of crosslinkers.

Embodiment 9. The method of any one of Embodiments 1 to 8, wherein the drilling fluid is an aqueous-based drilling fluid and the carrier comprises water or brine.

Embodiment 10. A method of removing cuttings from a wellbore, the method comprising:
circulating a pill or a sweep during a drilling operation into a wellbore, the pill or sweep comprising a superabsorbent polymer, the superabsorbent polymer comprising crosslinks formed before circulating the pill or sweep; and
sweeping drill cuttings to the surface of the wellbore.

Embodiment 11. The method of Embodiment 10, wherein circulating the pill or sweep and circulating a base drilling fluid occur at different times.

Embodiment 12. The method of Embodiment 10 or Embodiment 11, wherein the method further comprises periodically injecting the pill or sweep into the wellbore by adding the pill or sweep to a base drilling fluid circulating through the wellbore.

Embodiment 13. The method of any one of Embodiments 10 to 12, wherein the base drilling fluid is a water-based drilling fluid or an oil-based drilling fluid.

Embodiment 14. The method of Embodiment 13, wherein when the base drilling fluid is an oil-based drilling fluid, the superabsorbent polymer is at least partially hydrated before the pill or sweep is added to the base drilling fluid.

Embodiment 15. The method of any one of Embodiments 10 to 14, wherein circulating the pill or sweep comprises
  introducing the pill or sweep through a conduit inserted into the wellbore; and
  receiving a returning fluid comprising drill cuttings at the surface from an annular space between the conduit and a wall of the wellbore.

Embodiment 16. The method of Embodiment 15, wherein the conduit comprises a drilling string, casing string, tubing string or coiled tubing.

Embodiment 17. The method of any one of Embodiments 10 to 16, wherein the pill or sweep comprises greater than about 10 to less than about 80 pounds of the superabsorbent polymer per one thousand gallons of the pill or sweep.

Embodiment 18. The method of any one of Embodiments 10 to 17, wherein the superabsorbent polymer comprises a repeating unit derived from an acrylic acid or a salt thereof, an acrylate, an acrylamide, a vinylpyrrolidone, a vinyl acetate, a vinyl alcohol, a 2-acrylamide-2-methylpropanesulfonic acid, a derivative thereof, or a combination thereof; and the superabsorbent polymer comprises a plurality of crosslinks.

Embodiment 19. The method of any one of Embodiments 10 to 18, wherein the superabsorbent polymer is a copolymer of acrylic acid and sodium acrylate.

Embodiment 20. The method of any one of Embodiments 10 to 19, wherein the superabsorbent polymer comprises crosslinks derived from polyethylene glycol diacrylate.

Embodiment 21. The method of any one of Embodiments 10 to 21, wherein the pill or sweep further comprises water or brine.

All ranges disclosed herein are inclusive of the endpoints, and the endpoints are independently combinable with each other. As used herein, "combination" is inclusive of blends, mixtures, alloys, reaction products, and the like. All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." The modifier "about" used in connection with a quantity is inclusive of the stated value and has the meaning dictated by the context (e.g., it includes the degree of error associated with measurement of the particular quantity). Unless defined otherwise, technical and scientific terms used herein have the same meaning as is commonly understood by one of skill in the art to which this invention belongs. As used herein, the size or average size of the particles refers to the largest dimension of the particles and can be determined by high resolution electron or atomic force microscope technology.

All references cited herein are incorporated by reference in their entirety. While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

The invention claimed is:

1. A method of drilling a wellbore in a subterranean formation, the method comprising:
  circulating a water-based or oil-based drilling fluid in the subterranean formation; the water-based or oil-based drilling fluid comprising:
  a carrier,
  a superabsorbent polymer present in an amount effective to reduce fluid leakoff during the drilling operation, the superabsorbent polymer comprising crosslinks formed before the superabsorbent polymer is combined with the carrier, and
  a polysaccharide present in an amount of about 1 to about 30 pounds per thousand gallons of the drilling fluid,
  wherein the superabsorbent polymer comprises:
  a repeating unit derived from an acrylic acid or a salt thereof, an acrylate, an acrylamide, a vinylpyrrolidone, a vinyl acetate, a vinyl alcohol, a 2-acrylamide-2-methylpropanesulfonic acid, a derivative thereof, or a combination thereof, and
  crosslinks derived from a diacrylamide of piperazine, methylene bisacrylamide, ethylene bisacrylamide, N-methylol methacrylamide, N-methylol acrylamide, ethylene glycol diacrylate, poly(ethylene glycol) di(meth)acrylate, trimethylopropane tri(meth)acrylate, ethoxylated trimethylol tri(meth)acrylate, glycerol tri(meth)acrylate), ethoxylated glycerol tri(meth)acrylate, pentaerythritol tetra(meth)acrylate, ethoxylated pentaerythritol tetra(meth)acrylate, butanediol di(meth)acrylate), allyl (meth)acrylate, alkoxylated allyl(meth)acrylate, diallylamide of 2,2'-azobis(isobutyric acid), triallyl cyanurate, triallyl isocyanurate, maleic acid diallyl ester, a polyallyl ester, tetraallyloxyethane, triallylamine, or tetraallylethylene diamine, and
  the drilling fluid comprises greater than about 1 to less than about 40 pounds of the superabsorbent polymer per one thousand gallons of the drilling fluid, and is operable to achieve an American Petroleum Institute fluid loss of less than 15 cc.

2. The method of claim 1, wherein the superabsorbent polymer is in an unhydrated form before the superabsorbent polymer is combined with the carrier.

3. The method of claim 1, wherein the superabsorbent polymer is at least partially hydrated before the superabsorbent polymer is combined with the carrier.

4. The method of claim 1, wherein the superabsorbent polymer is a copolymer of acrylic acid and sodium acrylate.

5. The method of claim 4, wherein the superabsorbent polymer comprises crosslinks derived from polyethylene glycol diacrylate.

6. The method of claim 1, wherein the drilling fluid is free of crosslinkers.

7. The method of claim 1, wherein the drilling fluid is an aqueous-based drilling fluid and the carrier comprises water or brine.

8. The method of claim 1, wherein the drilling fluid is a water-in-oil emulsion.

9. The method of claim 1, wherein the drilling fluid is an all-oil based mud.

10. A method of removing cuttings from a wellbore, the method comprising:
  circulating a pill or a sweep during a drilling operation into a wellbore, the pill or sweep comprising water, a superabsorbent polymer, the superabsorbent polymer comprising crosslinks formed before circulating the pill or sweep, and a polysaccharide that aids in hydration of the superabsorbent polymer; and sweeping drill cuttings to the surface of the wellbore, wherein the superabsorbent polymer comprises:

a repeating unit derived from an acrylic acid or a salt thereof, an acrylate, an acrylamide, a vinylpyrrolidone, a vinyl acetate, a vinyl alcohol, a 2-acrylamide-2-methylpropanesulfonic acid, a derivative thereof, or a combination thereof, and crosslinks derived from a diacrylamide of piperazine, methylene bisacrylamide, ethylene bisacrylamide, N-methylol methacrylamide, N-methylol acrylamide, ethylene glycol diacrylate, poly(ethylene glycol) di(meth)acrylate, trimethylopropane tri(meth)acrylate, ethoxylated trimethylol tri(meth)acrylate, glycerol tri (meth)acrylate), ethoxylated glycerol tri(meth)acrylate, pentaerythritol tetra(meth)acrylate, ethoxylated pentaerythritol tetra(meth)acrylate, butanediol di(meth) acrylate), allyl (meth)acrylate, alkoxylated allyl(meth) acrylate, diallylamide of 2,2'-azobis(isobutyric acid), triallyl cyanurate, triallyl isocyanurate, maleic acid diallyl ester, a polyallyl ester, tetraallyloxyethane, triallylamine, tetraallylethylene diamine.

11. The method of claim 10, wherein circulating the pill or sweep and circulating a base drilling fluid occur at different times.

12. The method of claim 10, wherein the method further comprises periodically injecting the pill or sweep into the wellbore by adding the pill or sweep to a base drilling fluid circulating through the wellbore.

13. The method of claim 12, wherein the base drilling fluid is a water-based drilling fluid or an oil-based drilling fluid.

14. The method of claim 13, wherein the base drilling fluid is an oil-based drilling fluid, and the superabsorbent polymer is at least partially hydrated before the pill or sweep is added to the base drilling fluid.

15. The method of claim 10, wherein circulating the pill or sweep comprises introducing the pill or sweep through a conduit inserted into the wellbore; and receiving a returning fluid comprising drill cuttings at the surface from an annular space between the conduit and a wall of the wellbore.

16. The method of claim 15, wherein the conduit comprises a drilling string, casing string, tubing string or coiled tubing.

17. The method of claim 10, wherein the pill or sweep comprises greater than about 10 to less than about 80 pounds of the superabsorbent polymer per one thousand gallons of the pill or sweep.

18. The method of claim 10, wherein the superabsorbent polymer is a copolymer of acrylic acid and sodium acrylate.

19. The method of claim 10, wherein the superabsorbent polymer comprises crosslinks derived from polyethylene glycol diacrylate.

20. The method of claim 10, wherein the pill or sweep comprises a water-in-oil emulsion and the superabsorbent polymer.

21. The method of claim 10, wherein the pill or sweep comprises brine and the superabsorbent polymer.

22. The method of claim 10, wherein the pill or sweep is less than 150 barrels.

* * * * *